3,826,852
CASING-CARRIER ASSEMBLY AND METHOD
Robert M. Levaco, San Francisco, and Jordan A. Dolgoff, South San Francisco, Calif.; said Levaco assignor to Oppenheimer Casing Co.
Filed Oct. 28, 1971, Ser. No. 193,530
Int. Cl. A22c 13/00
U.S. Cl. 426—132
9 Claims

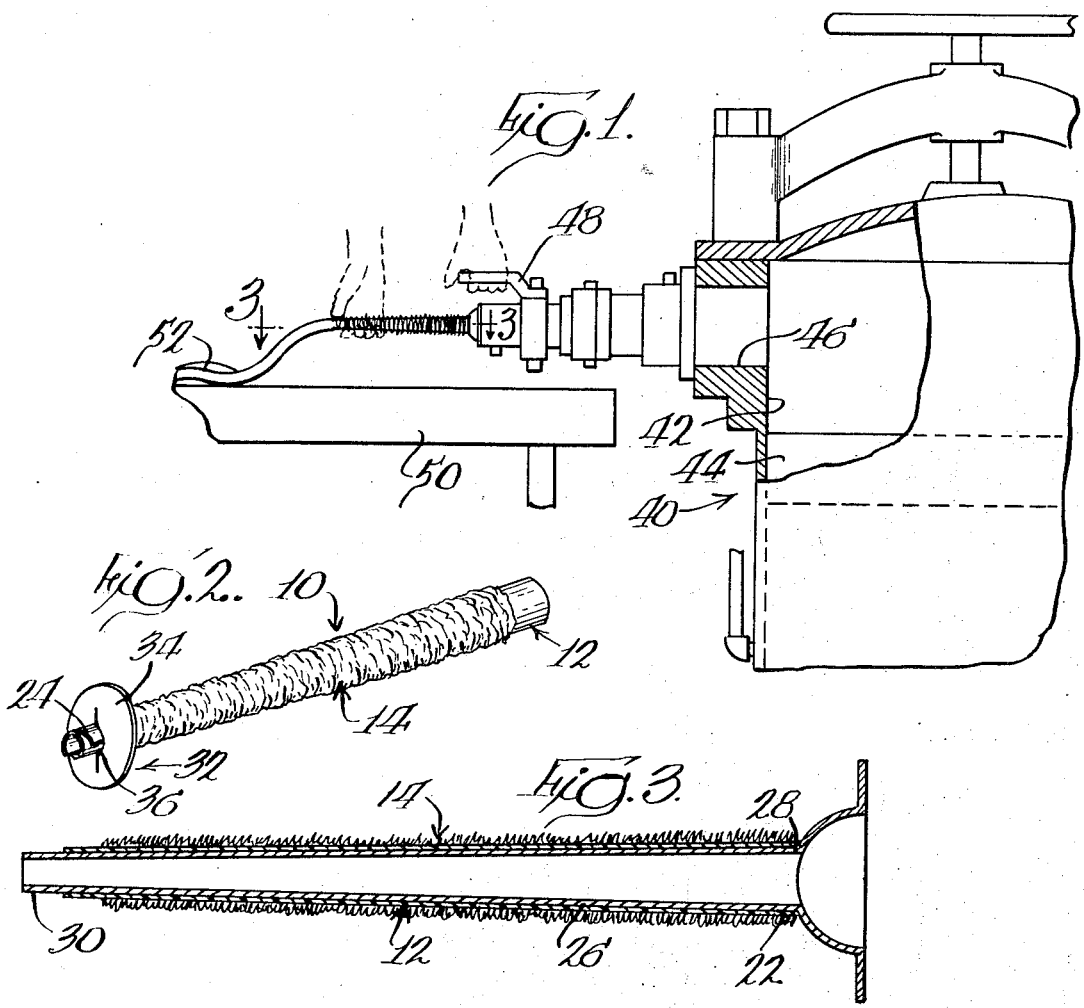
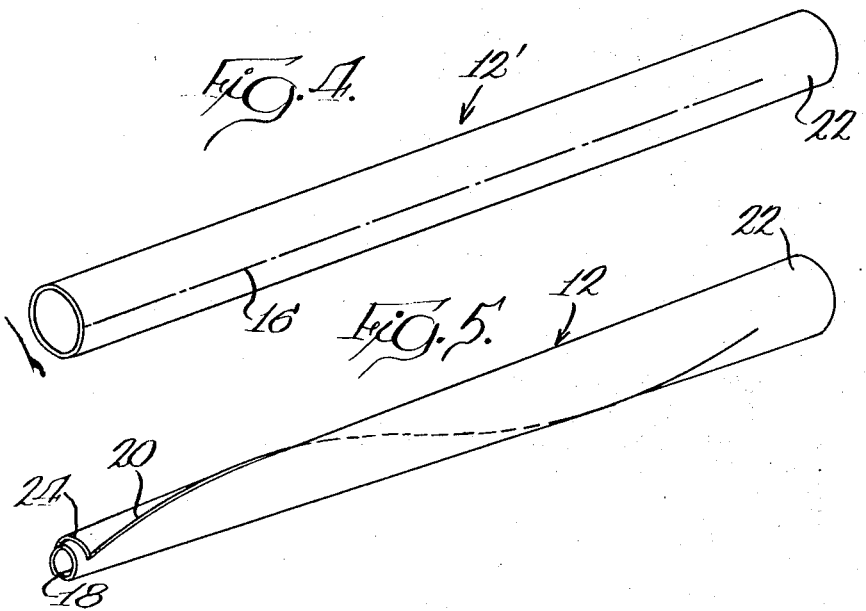

ABSTRACT OF THE DISCLOSURE

A natural casing is shirred onto a self-supporting tubular carrier member. The carrier member is formed of an extruded plastic material, such as polyethylene, which has an inherent elastic memory, and which is severed along a portion of its length prior to the placement of the casing thereon. The line of severance terminates short of one end of the tubular member to provide a closed circumferentially continuous end portion. The elastic memory of the material causes the wall portion adjacent one side of the line of severance to curl beneath the wall portion at the other side of the line of severance, so that the carrier member assumes a generally frusto-conical configuration. The inner diameter of the casing is larger than the small diameter portion of the carrier member so that the casing can be readily shirred thereon, although the inner diameter of the casing is smaller than the larger diameter portion of the carrier member to prevent axial displacement therefrom. A holding member is provided at the small diameter end of the carrier member to positively retain the casing in place.

BACKGROUND OF THE INVENTION

This invention relates in general to the sausage manufacturing art. Specifically, the invention relates to a novel carrier-casing assembly and method, and to the novel relationship between the assembly and sausage stuffing methods and apparatus.

The invention of the present application has particular utility with natural casings, i.e., those prepared from the edible intestines of animals such as sheep, lamb, or hogs as opposed to artificial or synthetic casings, such as those formed of regenerated cellulose. The present invention may also have applicability with collagen casings, particularly when it is desired to have a firm support for the casing.

In the natural casing industry, it is conventional to ship the casings great distances before they are actually stuffed to form a sausage type product. For example, it is common for U.S. sausage manufacturers to utilize casings from sheep that are raised and slaughtered in Australia and New Zealand. Because of the fragile nature of the intestines, and the necessity to thoroughly cleanse and preserve the same prior to shipment, various expedients have been utilized in the past to improve the packing and shipping characteristics of natural casings. However, the prior art techniques, which to a certain extent have solved the shipment and storage problems, have complicated the handling of the casings by the sausage manufacturer, with the net result that many man hours are lost in preparing the casings for the stuffing operation.

For example, it has been known in the past to initially clean the natural casings, and to subsequently store and ship the same in a salt solution in a sealed barrel. This usually results in the casings becoming entangled with one another, and it is a time-consuming and troublesome task for the sausage manufacturer to individualize the casings upon receipt. Furthermore, the casings must be thoroughly washed to remove any excess salt, and to place the casings in a condition suitable for stuffing.

To obviate the very substantial handling problems mentioned in the preceding paragraph, heretofore in the natural casing industry, it has been conventional to shirr a casing onto a limber, film-like plastic tube, and to form the tube into a loop. The opposite ends of the loop are then connected to one another, as by heat sealing, or by some form of a mechanical interlock to retain the casing in place on the flexible tube. This expedient had reduced some of the sausage manufacturer's handling problems, since the casings are maintained in an individualized and untangled condition. However, this expedient has not proven entirely satisfactory, since an undesirably large amount of time is required to disconnect the ends of the film-like flexible carrier member, and to place the same on the stuffing horn of a stuffing machine.

SUMMARY OF THE INVENTION

The casing-carrier assembly of the present invention obviates the problems noted above, in that in addition to providing a means whereby the casings are maintained in an untangled condition, it also provides a means whereby the casing can be directly placed upon the stuffing horn of a stuffing machine without the necessity of performing any intermediate manipulative steps. The resulting time savings and increased production speeds are substantial.

The carrier member of the present invention is a self-supporting tubular member that positively supports the casing thereon during shipment and storage. The carrier member has a smooth outer surface and may have a smooth inner surface, with the smooth inner surface facilitating telescopic insertion over the stuffing horn of a stuffing machine, and with the smooth outer surface facilitating payout of the casing during the stuffing operation. The carrier member is generally frusto-conically shaped throughout at least a major portion of its length, so as to be shaped generally complementarily with the tapered stuffing horns conventionally used in commercially available stuffing machines.

The carrier member is preferably formed of a suitable plastic material, such as polyethylene, that is extruded so as to give the carrier member an inherent elastic memory. The frusto-conical configuration is preferably produced by slitting the extruded, cylindrical tubular member along a major portion of its length, and displacing the edge portions of the wall on opposite sides of the slit, so that the portion of the wall on one side of the slit tends to curl under the wall portion at the opposite side of the slit. The amount of curl progressively increases outwardly of the end of the slit to the end of the carrier member, with the small diameter portion of the carrier member being substantially smaller than the internal diameter of the casing at its smallest portion to facilitate shirring of the casing onto the carrier member. The large diameter portion of the carrier member adjacent the unslit, circumferentially continuous end is larger than the internal diameter of the casing to prevent the casing from being displaced axially from the carrier member in one direction. Retention means, such as an apertured holding member, is placed on the small diameter portion of the carrier member to prevent axial movement of the casing in an opposite direction, so that the casing is positively restrained against movement in both directions. Since the carrier members are generally frusto-conically shaped, they lend themselves to compact nesting in a shipping container, since the larger diameter portions of the carrier members may be placed adjacent to the small diameter portions of other casing members, and vice versa.

In order to use the casing, it is necessary only for the sausage manufacturer to remove a carrier-casing assembly, and telescopingly engage the casing member with the stuffing horn of a stuffing machine. The inner diameter of the large diameter end of the carrier member is substantially larger than the outer diameter of the outer end of the stuffing horn, so that the carrier member may be readily slid thereover. The inner diameter of the small diameter portion of the carrier member is less than the outer diameter of the small diameter portion of the stuffing horn, so that as the carrier member is placed on the stuffing horn, the slit wall portion of the carrier member is spread slightly. Because of the inherent elastic memory of the material of the carrier member, a compressive force is applied to the stuffing horn that positively retains the carrier member in place. The carrier member preferably has a length that is less than the stuffing horn, so that a portion of the stuffing horn is exposed outwardly of the small diameter end of the carrier member to prevent dislodgment of the carrier member during the stuffing operation.

As will be readily apparent from the above summary, and the following detailed description, the simplified nature of the carrier-casing assembly of the present invention reduces the number of manipulative steps that must be performed by the sausage manufacturer to an absolute minimum, with the net result that a substantial increase in productivity is obtained.

BRIEF DESCRIPTION OF THE DRAWINGS

FIG. 1 is a side elevational view, partially in cross section, illustrating the carrier-casing assembly of the present invention in place on the stuffing horn of a stuffing machine;

FIG. 2 is an enlarged perspective view of the carrier-casing assembly illustrated in FIG. 1;

FIG. 3 is an enlarged cross sectional view through the stuffing horn and carrier-casing assembly of the present invention, taken generally along line 3—3 of FIG. 1;

FIG. 4 is a perspective view of the tubular carrier member prior to performance of the severing step; and FIG. 5 is a perspective view of the tubular carrier member subsequent to the performance of the severing step.

DESCRIPTION OF THE PREFERRED EMBODIMENT

While this invention is susceptible of embodiment in many different forms, there is shown in the drawings and will herein be described in detail a preferred embodiment of the invention, with the understanding that the present disclosure is to be considered as an exemplification of the principles of the invention and is not intended to limit the invention to the embodiment illustrated. The scope of the invention will be pointed out in the appended claims.

The carrier-casing assembly of the present invention is illustrated generally at 10 in FIG. 2, and the assembly 10 includes an elongated carrier member 12 and a casing 14 shirred thereon. Carrier member 12 has a length that is several times its largest diameter, with the length to diameter ratio being from about 5:1 to about 10:1, and preferably about 7.5:1. The carrier member 12 is generally frusto-conically shaped, and its method of manufacture will be best understood by considering FIGS. 4 and 5.

Carrier member 12 is made from a thin walled tubular member 12' (FIG. 4) that is formed of a material having an inherent elastic memory, preferably a plastic material, such as polyethylene. While the tube 12' is thin walled, on the order of 10 to 14 mils for polyethylene, it is rigid, as compared to the limber and film-like materials that are used in the prior art devices described above to form the loop type casing holders. Typical prior art carriers have a wall thickness of only about 2 mils, so that they can readily be formed into the looped configuration. In contrast, the tube 12' of the present invention is self-supporting, i.e., the tube will remain rigid if grasped at either of its ends.

In order to give the carrier member 12 its frusto-conical configuration, tube 12' is slit or severed along a straight line 16 throughout a major portion of its length. When the edges of the wall of the tube 12' on opposite sides of the line of severance 16 are displaced radially from one another, the inherent elastic memory that is built into the tube 12' by stretching during the extrusion operation causes one edge 18 of the wall to curl beneath the other edge 20, and provide the tapered configuration shown in FIG. 5. Depending upon the specific characteristics of the material from which tube 12' is made, the free end of edge 18 may curl substantially 360°, as illustrated in FIG. 5, although a tube with a substantially smaller amount of curl will also function satisfactorily for the purposes of the present invention. The exposed edge 18 on the inner surface of the carrier member 12 functions to assist in retaining the carrier member on the stuffing horn of a stuffing machine, as will hereinafter appear. Because of the resilient nature of the material, the wall portion adjacent edge 20 is urged against the adjacent wall portion of the carrier member, so that the edge 20 does not present an impediment during deshirring of the casing, as will also hereinafter appear.

The unslit, circumferentially continuous large diameter end 22 of the carrier member 12 has an inner diameter that is substantially larger than the outer diameter of the tip end of the stuffing horn, so that the carrier member 12 may be readily placed thereon. The small diameter tip portion 24 of the carrier member has an internal diameter that is smaller than the outer diameter adjacent the end of the stuffing horn to assist in retaining the carrier member thereon.

With specific reference to FIG. 3, it will be seen that the stuffing horn 26 is a tapered, tubular member, as is conventionally used to extrude a meat emulsion into a casing. In a typical embodiment, the base 28 of the stuffing horn has a diameter of approximately 19 millimeters, and the tip 30 of the horn has a diameter of approximately 11½ millimeters. The large diameter end portion 22 of the carrier member may also have an inner diameter of approximately 19 millimeters, so as to be readily positionable over the tip of the stuffing horn 26. The inner diameter of small diameter end portion 24 of the carrier member may be approximately 8 to 10 millimeters, so as to be somewhat smaller than the outer diameter of the end portion 30 of the stuffing horn. As a result, when the carrier-casing assembly 10 is telescoped onto the stuffing horn 26, the split end portion of the carrier member will spread slightly and the inherent resiliency of the carrier member will cause the same to closely conform to the stuffing horn and apply a compressive force thereto. The carrier member 12 has a length that is less than the length of the stuffing horn 26, so that a substantial portion of the stuffing horn, viz. ¾ inch, extends beyond the end of the carrier member, as can be seen in FIG. 3. This prevents the carrier-casing assembly 12 from being dislodged from the stuffing horn during the deshirring and stuffing operation.

After the carrier member 12 has been formed by slitting the tube 12' in the aforedescribed manner, the casing 14 is shirred onto the carrier member and the internal diameter of shirred casing 14 is less than the outer diameter of the large diameter portion 22 of the carrier member 12, so that the casing 14 is positively prevented from moving axially to the right of the carrier member 12, as viewed in FIG. 2. The internal diameter of shirred casing 14 is preferably larger than the end portion 24 of the carrier member, so that the casing can be readily shirred thereon. Ordinarily, the inner diameter of a natural casing varies only slightly from one end to the other, so that there is no criticality as to which end of the casing is first shirred onto the carrier member. In instances where one end of the casing is noticeably larger than the other, the large diameter end of the casing is first shirred onto the carrier member.

In order to prevent the casing 14 from moving axially to the left along carrier member 12, as viewed in FIG. 2, retention means 32 is placed upon the small diameter portion 24 of the carrier member. Retention means 32 may take the form of a thin, flat holding member 34 having an aperture 36 therein that is force fit upon the small diameter portion of the carrier member to positively retain the casing 14 in place. The holding member 34 may have any external configuration, as will be readily understood.

Once the casing 14 has been cleaned, and shirred onto carrier member 12, a plurality of the resulting assemblies 10 may be nested together in a shipping container with the large diameter portions 22 adjacent the small diameter portions 24. When it is desired to utilize the carrier-casing assembly 10, the operator merely removes the assembly from the shipping container, removes the retention member 32 and telescopes the assembly onto the stuffing horn 26. The wide mouth of large diameter portion 22, and the smooth inner surface of the carrier member 12 facilitate the placement of the assembly 10 on the stuffing horn. As the assembly 10 is moved to the right, as viewed in FIG. 3, the small diameter portion 24 of the carrier member 12 is spread outwardly, so that the carrier member applies a positive gripping force to the stuffing horn. This gripping force, in combination with the exposed edge 18, functions to positively retain the assembly 10 in place on the stuffing horn 26.

A conventional stuffing machine is shown generally at 40 in FIG. 1, and machine 40 includes a chamber 42 adapted to receive a meat emulsion therein. A piston 44 is mounted for vertical movement within chamber 42 for forcing the meat emulsion outwardly of an outlet 46 that communicates with the stuffing horn 26. The piston 44 may be pneumatically, or hydraulically actuated, as is known in the art. As is also well known in the art, a stuffing valve 48 is provided adjacent the end of stuffing horn 26, so that an operator can manipulate the valve 48 with one hand while simultaneously paying out the casing 14 with the other hand during the stuffing operation. A work table 50 is preferably provided adjacent the outlet end of the stuffing horn 26 for receiving the resulting sausage product 52. Depending on the type of product being made, the stuffed casing may be continuous in length, or pass through an automatic linker, as is well known in the art.

While a specific form of stuffing machine has been illustrated and described, it will be understood by those skilled in the art that the casing-carrier assembly of the present invention has general applicability to other types of conventional stuffing machines not specifically described herein.

What is claimed is:

1. The process of preparing a natural casing for a sausage type product for stuffing by a sausage manufacturer comprising: providing a self-supporting, tubular carrier member of predetermined length, said tubular carrier member being made of a plastic material having an elastic memory and being formed by a process including a stretching step to provide a cylindrical thin walled member; severing the wall of said member along a portion of its length, the line of severance terminating short of one end of said thin walled member to provide a closed circumferentially continuous end portion, whereby the elastic memory of said material causes a portion of the wall of said member at one side of the line of severance to curl under the portion of the wall of said member at the other side of said line of severance, the amount of said curl progressively increasing away from the closed circumferentially continuous end portion of the thin walled member to give said carrier member a generally frusto-conical shape; and shirring a natural casing onto said carrier member.

2. The process of claim 1 in which the inner diameter of said shirred casing at its largest portion is smaller than the large diameter portion of said carrier member and at its smallest portion is larger than the small diameter portion of said carrier member, and wherein a retention member is placed on the small diameter portion of said carrier member to positively retain the casing in place.

3. The process of preparing a natural casing for a sausage type product for stuffing by a sausage manufacturer comprising: providing a self-supporting, tubular carrier member of predetermined length, said carrier member being made of a plastic material having an elastic memory that is initially formed by a process including a stretching step to provide a cylindrical thin walled member; severing a portion of the wall of said member in a straight line along a portion of its length, the line of severance terminating short of one end of said thin walled member to provide a closed circumferentially continuous end portion, whereby the elastic memory of said material causes a portion of the wall of said member at one side of the line of severance to curl under the portion of the wall of said member at the other side of said line of severance, the amount of said curl progressively increasing away from the closed circumferentially continuous end portion of the thin walled member to give said carrier member a generally frusto-conical shape which is substantially complementary with the shape of the stuffing horn to be utilized by the sausage manufacturer; shirring a natural casing onto said carrier member, the largest portion of said shirred casing having an inner diameter that is smaller than the large diameter portion of said carrier member and the smallest portion of said shirred casing having an inner diameter that is larger than the small diameter portion of said carrier member, and placing a retention member on the small diameter portion of said carrier member to positively retain the casing in place.

4. The process of claim 2 wherein said carrier member is initially formed by extrusion.

5. The process of preparing a natural casing for a sausage type product for stuffing by a sausage manufacturer comprising: providing a self-supporting, tubular carrier member of predetermined length, said carrier member being made of a plastic material having an elastic memory and said tubular member being formed by a process including a stretching step to provide a cylindrical thin walled member; severing the wall of said member along a portion of its length, the line of severance terminating short of one end of said thin walled member to provide a closed circumferentially continuous end portion, whereby the elastic memory of said material causes a portion of the wall of said member at one side of the line of severance to curl under the portion of the wall of said member at the other side of said line of severance by an amount which progressively increases away from the closed circumferentially continuous end portion of the thin walled member to give said carrier member a generally frusto-conical shape that is substantially complementary with the shape of the stuffing horn to be utilized by the sausage manufacturer, shirring a natural casing onto said carrier member, the large diameter portion of said carrier member being larger than the inner diameter of said shirred casing at its largest portion to positively restrain the casing against axial movement in one direction along said carrier member; the small diameter portion of said carrier member being smaller than the inner diameter of said shirred casing at its smallest portion; and positively restraining said casing against axial movement in an opposite direction along said carrier member by placing a holding member on said small diameter portion.

6. A casing-carrier assembly comprising: a self-supporting tubular carrier member formed of a plastic material having an elastic memory, said carrier member having a generally cylindrically shaped-circumferentially continuous first end portion and a generally frusto-conically shaped second end portion, said second end portion being slit from end-to-end thereof to provide edge portions on opposite sides of said slit, the elastic memory of the material of said carrier member causing said second end portion to progressively contract when one edge portion is displaced from the other to give the second end portion its frusto-conical shape, a shirred natural casing positioned on the second end portion of said carrier member, the inner diameter of the largest portion of the shirred casing being smaller than the large diameter end of the second portion of said carrier member and the inner diameter of the smallest portion of the shirred casing being larger than the small diameter end of the second portion of the carrier member, and retention means positioned on the small diameter end of the second portion of the carrier member whereby said casing is positively restrained against axial movement relative to said carrier member.

7. A casing-carrier assembly as set forth in claim 6 wherein said retention means is an apertured member forcefit over the small diameter end of the second portion of the carrier member.

8. A casing-carrier assembly as set forth in claim 6 wherein said carrier member is formed of an extruded plastic material.

9. A casing-carrier assembly as set forth in claim 6 wherein said plastic material is polyethylene.

References Cited

UNITED STATES PATENTS

| | | | |
|---|---|---|---|
| 3,148,991 | 9/1964 | Svendsen | 99—175 |
| 1,616,971 | 2/1927 | Henderson | 99—175 |
| 1,938,070 | 12/1933 | Friedler | 99—176 |
| 3,468,413 | 9/1969 | McMillan | 99—175 |
| 3,115,240 | 12/1963 | Flomen et al. | 99—175 |
| 1,868,203 | 7/1932 | Henderson et al. | 99—175 |
| 1,538,460 | 5/1925 | Brecht | 99—175 |

FOREIGN PATENTS

| | | | |
|---|---|---|---|
| 677,517 | 1/1964 | Canada | 99—175 |
| 942,207 | 11/1963 | Great Britain | 99—175 |
| 139,862 | 11/1964 | New Zealand | 99—175 |
| 155,508 | 2/1969 | New Zealand | 99—175 |

JOSEPH SCOVRONEK, Primary Examiner

S. B. DAVIS, Assistant Examiner

U.S. Cl. X.R.

17—45; 206—46 F; 426—140